United States Patent
Huang

(10) Patent No.: US 7,859,868 B2
(45) Date of Patent: Dec. 28, 2010

(54) SYNCHRONOUS RECTIFIER CONTROL CIRCUIT WITH DEADTIME ADJUSTMENT TO PREVENT CROSSOVER CONDUCTION

(75) Inventor: Ming-Ho Huang, Taipei Hsien (TW)

(73) Assignee: Hipro Electronics Co., Ltd., San Chung (TW)

( * ) Notice: Subject to any disclaimer, the term of this patent is extended or adjusted under 35 U.S.C. 154(b) by 365 days.

(21) Appl. No.: 12/078,008

(22) Filed: Mar. 26, 2008

(65) Prior Publication Data

US 2009/0244942 A1    Oct. 1, 2009

(51) Int. Cl.
*H02H 7/125*    (2006.01)
(52) U.S. Cl. .......................... 363/53; 363/89
(58) Field of Classification Search ............. 363/52, 363/53, 84, 89, 127
See application file for complete search history.

(56) References Cited

U.S. PATENT DOCUMENTS

2009/0244942 A1* 10/2009 Huang ................... 363/89
2009/0268494 A1* 10/2009 Hu ....................... 363/89

* cited by examiner

*Primary Examiner*—Jeffrey L Sterrett
(74) *Attorney, Agent, or Firm*—Apex Juris, PLLC; Tracy M Heims

(57) ABSTRACT

A synchronous rectification control circuit is connected with a secondary-side rectification circuit and includes a driving circuit, a dead-time acquisition circuit, and a zero-voltage detection circuit. The driving circuit includes a differentiating circuit, a first comparator, and a capacitor, wherein the differentiating circuit generates a signal to the first comparator and the capacitor functions to charge and discharge to form a cycle. The dead-time acquisition circuit includes a second comparator and a third comparator, wherein the second comparator has a positive input connected to an output of the first comparator of the driving circuit, the second comparator has an output connected to a positive input of the third comparator, and the third comparator has a negative input connected to the output of the first comparator to acquire a dead-time signal. The zero-voltage detection circuit includes a fourth comparator and a totem pole circuit, wherein the fourth comparator has a negative input connected to an input terminal of the driving circuit for detecting a potential present in the input terminal of the driving circuit and the fourth comparator has an output that is connected to the totem pole circuit to supply an output of a signal. With such an arrangement, shorting is prevented from occurring in the secondary-side rectification circuit.

8 Claims, 4 Drawing Sheets

SYNCHRONOUS RECTIFIER CONTROL CIRCUIT WITH DEADTIME ADJUSTMENT TO PREVENT CROSSOVER CONDUCTION

FIELD OF THE INVENTION

The present invention relates to a synchronous rectification control circuit, which allows for an arrangement of connecting the synchronous rectification control circuit to a secondary-side rectification circuit to realize enhancement of energy conversion efficiency and at the same time preventing two current switches of opposite directions from being simultaneously turned on to lead to crossover conduction and cause shorting and burning out of the current switches, and which is applicable to power supply devices or the likes.

BACKGROUND OF THE INVENTION

With the development of technology, electrical power supply devices have been getting wider and wider applications. More and more products incorporate the power supply device, especially for personal computers, industrial computers, exchange devices, cash registers, printers, which all need alternate current to direct current power conversion and use a switching construction to turn on/off the power.

The currently available switching power supply device often adopt pulse width modulation (PWM) type control for output of direct current for the reason of reducing the size of transformer. An example is shown in FIG. 1, which illustrates a circuit diagram of a conventional forward circuit. A transformer T1 splits a circuit zone into a primary circuit on a primary side and a secondary circuit on a secondary side. PWM control means on the primary circuit of the primary side is connected to the secondary circuit of the secondary side so that a voltage feedback is returned from the secondary circuit to adjust the duty cycles of two ON/OFF switches $S_1$, $S_2$ on the primary side to realize stable output of voltage.

By the switching operation of the two switches $S_1$, $S_2$, electrical power stored in a capacitor can be transmitted through a coupling capacitor to the primary side of the transformer $T_1$ to serve as an alternate current power source. The alternate current power source provides electrical energy to the transformer $T_1$ and the transformer $T_1$ transforms the energy to the secondary side. The secondary side of the transformer is coupled through a rectification unit to an energy accumulation inductor Lo and then to a load. When both switches $S_1$, $S_2$ are open or turned off, the energy accumulation inductor $L_0$ releases energy to supply the required electrical power, and a capacitor $C_1$ is used to provide filtering of direct current. The secondary side is connected to diodes $D_1$, $D_2$ to convert alternate current waveform into direct current waveform. The diodes $D_1$, $D_2$, when conducted on, cause a voltage drop of 0.4V-1.5V. Thus, when current output is significant, a great loss of power may occur, leading to poor efficiency.

To conclude, the above described architecture of the conventional circuit is disadvantageous in potential risk of great loss of power and consequently poor efficiency.

Thus, the present invention is aimed to provide a circuit architecture wherein a synchronous rectification control circuit is coupled to the secondary-side rectification circuit to reduce the conduction-on power loss.

SUMMARY OF THE INVENTION

An objective of the present invention is to provide a synchronous rectification control circuit, which allows for an arrangement of coupling the synchronous rectification control circuit to a secondary-side rectification circuit for adjusting dead time to enhance energy conversion efficiency.

Another objective of the present invention is to provide a synchronous rectification control circuit, wherein the synchronous rectification control circuit is coupled to a secondary-side rectification circuit to prevent two rectification switches that are of opposite directions to simultaneously closed, leading to crossover conduction and causing burning out of current switches by excessive current generated.

To realize the above objectives, in accordance with the present invention, a synchronous rectification control circuit is provided, comprising a driving circuit, a dead-time acquisition circuit, and a zero-voltage detection circuit. The driving circuit comprises a differentiating circuit, a first comparator, and a capacitor, wherein the differentiating circuit generates a signal to the first comparator and the capacitor functions to charge and discharge to form a cycle. The dead-time acquisition circuit comprises a second comparator and a third comparator, wherein the second comparator has a positive input connected to an output of the first comparator of the driving circuit, the second comparator has an output connected to a positive input of the third comparator, and the third comparator has a negative input connected to the output of the first comparator to acquire a dead-time signal. The zero-voltage detection circuit comprises a fourth comparator and a totem pole circuit, wherein the fourth comparator has a negative input connected to an input terminal of the driving circuit for detecting a potential present in the input terminal of the driving circuit and the fourth comparator has an output that is connected to the totem pole circuit to supply an output of a signal. With such an arrangement, shorting is prevented from occurring in the secondary-side rectification circuit.

BRIEF DESCRIPTION OF THE DRAWINGS

The present invention will be apparent to those skilled in the art by reading the following description of a preferred embodiment thereof with reference to the drawings, in which.

DETAILED DESCRIPTION OF THE PREFERRED EMBODIMENT

Figure 1:
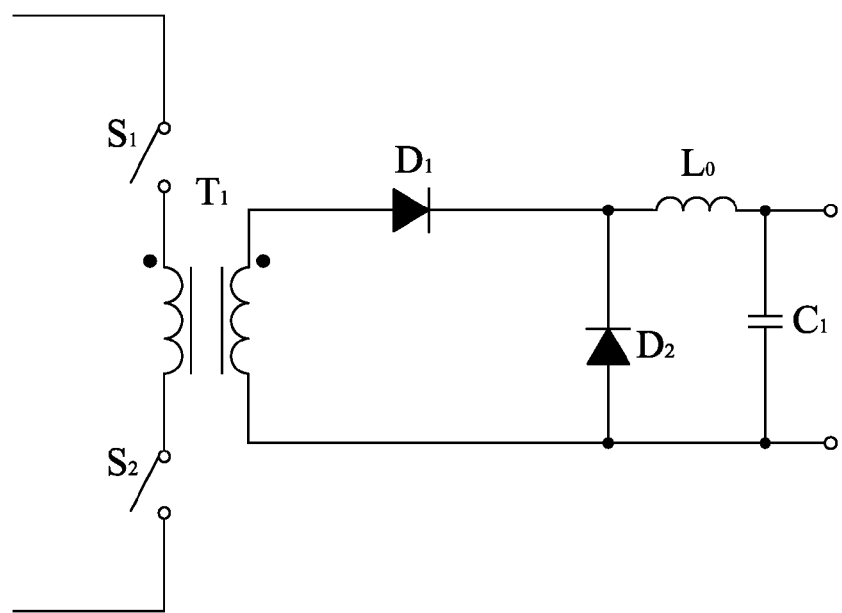
FIG. 1 is a schematic circuit diagram of a conventional forward circuit for power supply.
Figure 2:
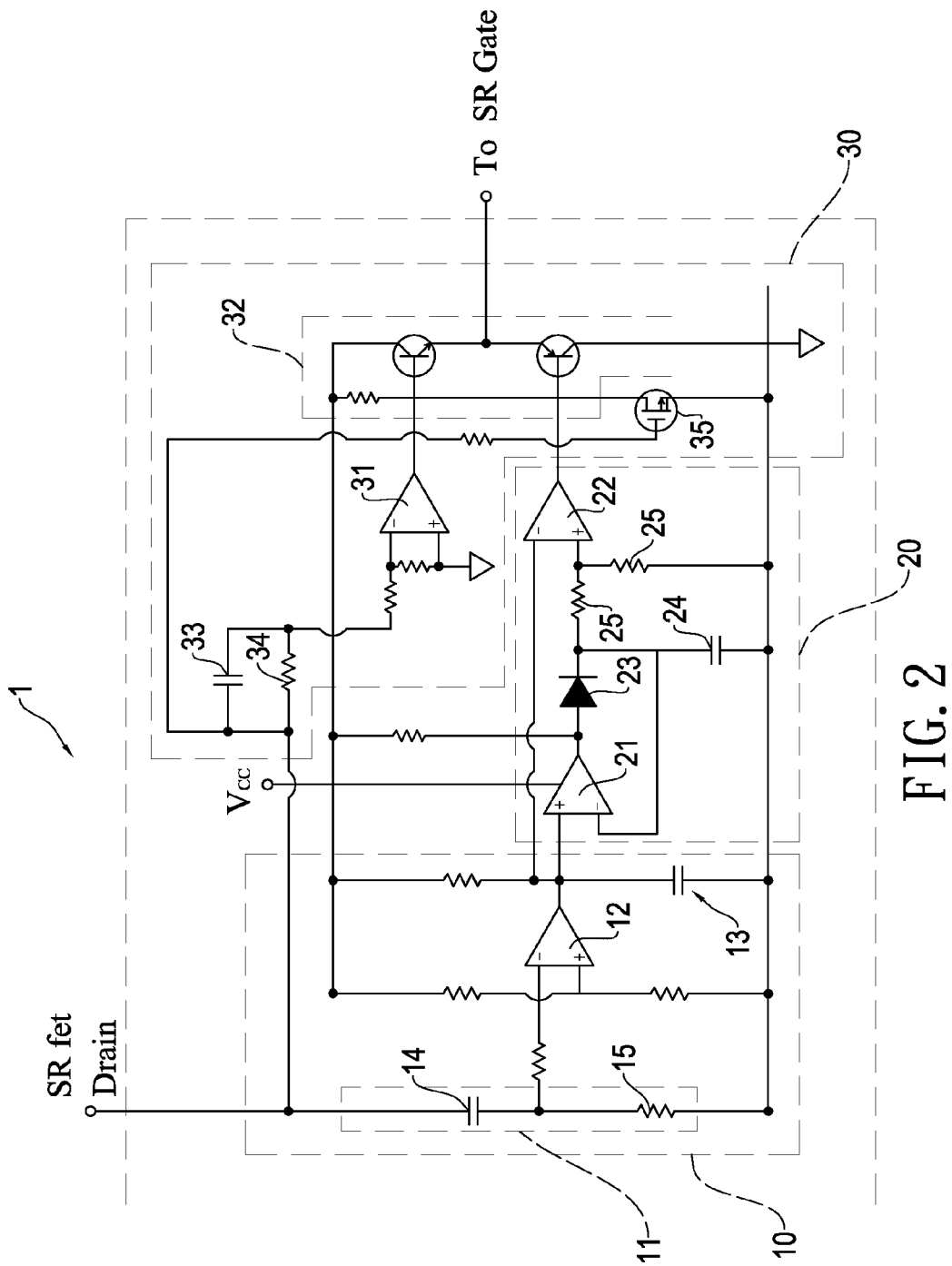
FIG. 2 is a circuit diagram of a synchronous rectification control circuit in accordance with the present invention.

With reference to the drawings and in particular to FIG. 2, which shows a circuit diagram of a synchronous rectification control circuit in accordance with the present invention, the synchronous rectification control circuit of the present invention, which is for connection with a secondary-side rectification circuit, comprises a driving circuit 10, a dead-time acquisition circuit 20, and a zero-voltage detection circuit 30. The driving circuit 10 comprises a differentiating circuit 11, a first comparator 12 and a capacitor 13, wherein the differentiating circuit 11 functions to generate a signal to the first comparator 12 and the capacitor 13 functions for charging and discharging to form a cycle. The dead-time acquisition circuit 20 comprises a second comparator 21 and a third comparator 22, wherein a positive input f the second comparator 21 is connected to an output of the first comparator 12 of the driving circuit 10, an output of the second comparator 21 is connected to a positive input of the third comparator 22, and the a negative input of the third comparator 22 is connected to the output of the first comparator 12 for acquisition of a dead-time signal. The zero-voltage detection circuit 30 comprises a fourth comparator 31 and a totem pole circuit 32, wherein a negative input of the fourth comparator 31 is connected to an input of the driving circuit 10 for detecting the potential at the input of the driving circuit 10 and an output of the fourth comparator 31 is connected to the totem pole circuit 32 for supplying an output signal. Such an arrangement help protecting the secondary-side rectification circuit from shorting.

Figure 3:
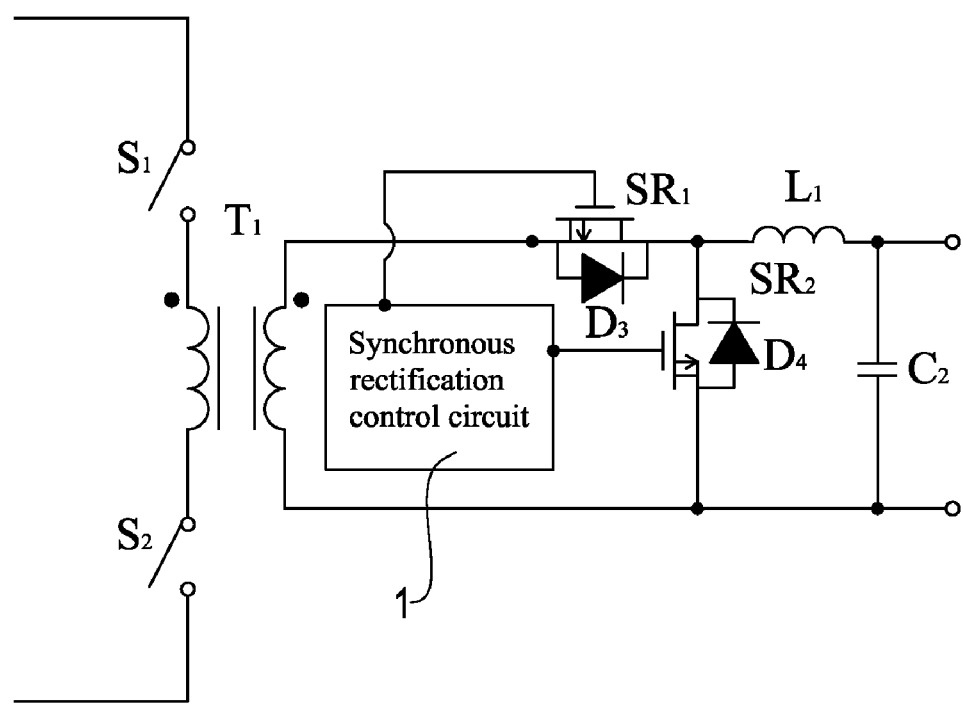
FIG. 3 is a circuit diagram illustrating an application of the synchronous rectification control circuit of the present invention.

Referring to FIGS. 2 and 3, which respectively illustrates the circuit diagram of the synchronous rectification control circuit of the present invention and an application thereof in a secondary-side rectification circuit, the secondary-side rectification circuit is incorporated in a forward power conversion device, which comprises a transformer $T_1$, two ON/OFF switches $S_1$, $S_2$, two rectification switches, which are a first rectification switch $SR_1$ and a second rectification switch $SR_2$, an energy accumulation inductor $L_1$, and a filter capacitor $C_2$. The ON/OFF switches $S_1$, $S_2$ function to control the conduction between a primary side of the transformer $T_1$ and an input voltage source. The first and second rectification switches $SR_1$, $SR_2$, serving as synchronous rectifiers, are connected to a secondary side of the transformer $T_1$. The first rectification switch $SR_1$ is coupled between a first terminal of the secondary side and a first grounding point, while the second rectification switch $SR_2$ is connected from a second terminal of the secondary side to the grounding point. Further, the first and second rectification switches $SR_1$, $SR_2$ can be any power switch or metal-oxide semiconductor or junction field-effect transistor (JFET), metal-oxide-semiconductor field-effect transistor (MOSFET). The energy accumulation inductor $L_1$ is coupled between the second terminal of the secondary side and an output terminal of power conversion device. The filter capacitor $C_2$ is connected between the output terminal of the power conversion device and the grounding point. When the ON/OFF switches $S_1$, $S_2$ are closed, power is supplied from the input voltage source through the transformer $T_1$ and the energy accumulation inductor $L_1$ to the output terminal of the power conversion device, and the first rectification switch $SR_1$ is conducted on after a parasitic diode $D_3$ is conducted on. When the ON/OFF switches $S_1$, $S_2$ are opened, the energy accumulated in the energy accumulation inductor $L_1$ is supplied through a parasitic diode $D_4$ of the second rectification switch $SR_2$ for continuous discharging through the output terminal, and the second rectification switch $SR_2$ is conducted on after the parasitic diode $D_4$ is conducted on. The forward power conversion device has two different operation modes, namely non-continuous operation mode and continuous operation mode. In the continuous operation mode, energy is preserved in the energy accumulation inductor $L_1$, so that the next operation or working cycle starts before the current released from the energy accumulation inductor $L_1$ reaches zero. Thus, in the second operation or working cycle, the second rectification switch $SR_2$ is conducted on to serve as a synchronous rectifier and thus after the next cycle starts, crossover conduction is likely to occur, leading to shorting of the secondary side through the second rectification switch $SR_2$ and the parasitic diode $D_4$. During the crossover conduction, electromagnetic interference (EMI) will occur, and the lifespan of the first and second rectification switches $SR_1$, $SR_2$ might be severely shortened. On the other hand, in the non-continuous operation mode, all the energy preserved in the energy accumulation inductor $L_1$ has already been fully consumed before the next cycle starts. Consequently, no induced voltage is maintained in the energy accumulation inductor $L_1$ to prevent power discharged from the capacitor from applied back to the transformer.

The synchronous rectification control circuit 1 is comprised of the driving circuit 10, the dead-time acquisition circuit 20, and the zero-voltage detection circuit 30. The driving circuit 10 is comprised of the differentiating circuit 11, the first comparator 12, and the capacitor 13, wherein the differentiating circuit 11 provides a signal to the first comparator 12 and the capacitor 13 operates to charge and discharge to form a cycle. The differentiating circuit 11 is comprised of a capacitor 14 in series connection with a resistor 15 to form a high pass filter with the capacitor 14 receiving input signal and connection node between the capacitor 14 and the resistor 15 supplying an output signal. The capacitor 14 allows only high frequency signals to pass therethrough and blocks low frequency signals or direct current. The capacitor 14 is also connected to drain of the first rectification switch $SR_1$ to receive signals supplied from the drain of the first rectification switch $SR_1$ and further the differentiating circuit 11 functions for discharging. Thus, the capacitor 13 may be instantaneously reset when the input signal is positive, and a new cycle starts. The dead-time acquisition circuit 20 comprises the second and third comparators 21, 22, wherein the positive input of the second comparator 21 is connected to the output of the first comparator 12 of the driving circuit 10 to provide peak detection for input signals. The output of the second comparator 21 is connected to the positive input of the third comparator 22 wherein between the output of the second comparator 21 and the positive input of the third comparator 22, a diode 23 is serially connected and a capacitor 24 and a resistor 25 are connected in parallel. The second comparator 21 receives input of a power source Vcc to serve as a reference voltage for detection purposes. The negative input of the third comparator 22 is connected to the output of the first comparator 12 to acquire 98% voltage of the peak detection and synchronous rectification is disabled when voltage exceeds 98%, whereby a dead-time signal of 2% voltage difference can be obtained. The zero-voltage detection circuit 30 is comprised of the fourth comparator 31 and the totem pole circuit 23, wherein the negative input of the fourth comparator 31 is connected to the input of the driving circuit 10 and the positive input of the fourth comparator 31 is grounded to provide a comparison of voltage difference with respect to the negative input. The output of the fourth comparator 31 is connected to the totem pole circuit 32 and a capacitor 33 and a resistor 34 are connected in parallel between the negative input of the fourth comparator 31 and the input of the driving circuit 10 with an end of the parallel connection is connected to a switch 35 for controlling signal. The switch 35 is a P type MOS switch. The potential detected at the input (drain) of the driving circuit 10 must drop to a voltage level that is be below 0V when current is input and the output of the fourth comparator 31 can drive the totem pole circuit 32 to open and a signal is transmitted through the totem pole circuit 32 to the gate of the second rectification switch $SR_2$ of synchronous rectification to make it conducted on. On the other hand, when the input (drain) of the driving circuit is of a potential that exceeds 0V at the time when current is input, the totem pole circuit 32 is made off to ensure the second rectification switch $SR_2$ is conducted on or off in proper cycles, thereby preventing breakdown and shorting from occurring.

Figure 4:
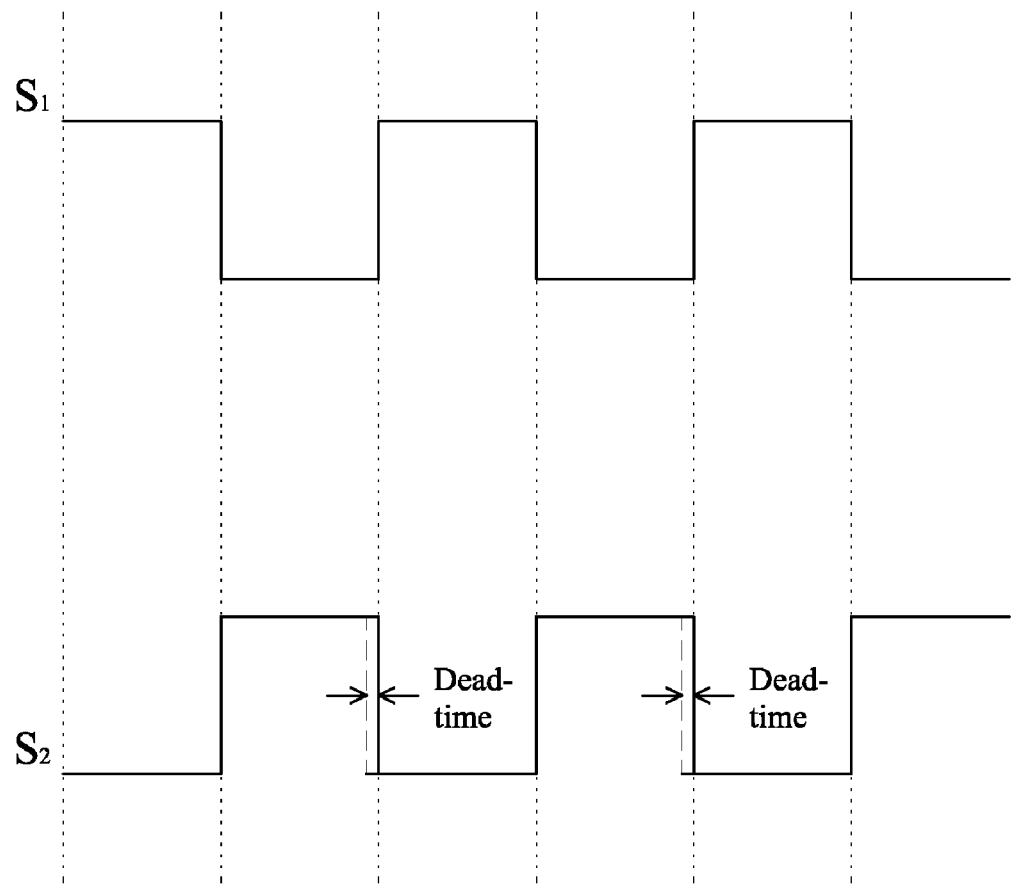
FIG. 4 shows an operation waveform diagram for the synchronous rectification control circuit of the present invention.

Referring to FIG. 4, which illustrates operation waveform diagram for the synchronous rectification control circuit, and with also reference to the circuit diagrams of FIGS. 2 and 3, the present invention uses the secondary side of the transformer $T_1$ to generate forward synchronous control voltage signal, which is applied to the driving circuit 10 of the synchronous rectification control circuit 1. When the primary side of the transformer $T_1$ is switched on, a high potential is output to conduct on the first current switch $SR_1$ of the secondary side of synchronous rectification and the second current switch $SR_2$ of synchronous rectification on the secondary side of the transformer $T_1$ is set in off state. When the primary side of the transformer $T_1$ is turned off, the synchronous control voltage signal of the secondary side of the transformer $T_1$ becomes low, making the first current switch $SR_1$ of synchronous rectification off and at the same time, the second current switch $SR_2$ of fly-wheeling synchronous rectification receives a gate signal from the first rectification switch $SR_1$ so that when the gate signal of the first rectification switch $SR_1$ becomes low voltage, the gate signal of the second rectification switch $SR_2$ immediately becomes high, making the second current switch $SR_2$ of fly-wheeling synchronous rectification on. The conduction-on cycle of the second current switch $SR_2$ of fly-wheeling synchronous rectification must get over before the next conduction on of the first current switch $SR_1$, otherwise the first and second current switches $SR_1$, $SR_2$ may be simultaneously conducted on, leading to server shorting problem. By using the dead-time acquisition circuit 20 of the synchronous rectification control circuit 1 to carry out peak detection to acquire the 98% voltage of the peak detection and shutting down synchronous rectification when 98% voltage is exceeded, a dead-time signal of 2% voltage difference can be obtained, which makes the second current switch $SR_2$ of fly-wheeling synchronous rectification conducted on or off in the cycles to eliminate shorting problems.

Apparently, the present invention possesses the following advantages:

(1) The present invention ensures the second rectification switch to get on/off in proper cycles to thereby prevent problems of breakdown and shorting from occurring.

(2) The present invention can enhance energy conversion efficiency by adjusting the dead time.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A synchronous rectification control circuit for connection with a secondary-side rectification circuit, comprising:
a driving circuit comprising a differentiating circuit, a first comparator, and a capacitor, wherein the differentiating circuit generates a signal to the first comparator and the capacitor functions to charge and discharge to form a cycle;
a dead-time acquisition circuit comprising a second comparator and a third comparator, wherein the second comparator has a positive input connected to an output of the first comparator of the driving circuit, the second comparator has an output connected to a positive input of the third comparator, and the third comparator has a negative input connected to the output of the first comparator to acquire a dead-time signal; and
a zero-voltage detection circuit comprising a fourth comparator and a totem pole circuit, wherein the fourth comparator has a negative input connected to an input terminal of the driving circuit for detecting a potential present in the input terminal of the driving circuit and the fourth comparator has an output that is connected to the totem pole circuit to supply an output of a signal;
wherein shorting is prevented from occurring in the secondary-side rectification circuit.

2. The synchronous rectification control circuit as claimed in claim 1, wherein the secondary-side rectification circuit comprises a transformer, two rectification switches, an energy accumulation inductor, and a filter capacitor, one side of the transformer being connected in series to the two rectification switches, the two rectification switches being connected in opposite directions and being connected in series to the energy accumulation inductor, and the filter capacitor for providing a stable voltage output.

3. The synchronous rectification control circuit as claimed in claim 2, wherein the rectification switches are selected from a group consisting of metal-oxide semiconductor, junction field-effect transistor, metal-oxide-semiconductor field-effect transistor.

4. The synchronous rectification control circuit as claimed in claim 1, wherein the output of the second comparator and the positive input of the third comparator of the dead-time acquisition circuit are connected therebetween a diode in series and a capacitor and a resistor in parallel.

5. The synchronous rectification control circuit as claimed in claim 1, wherein the second comparator of the dead-time acquisition circuit is provided with an input of power source to provide a reference voltage for detection purposes.

6. The synchronous rectification control circuit as claimed in claim 1, wherein the negative input of the fourth comparator of the zero-voltage detection circuit and the input terminal of the driving circuit are connected therebetween a capacitor and a resistor in parallel, one terminal of said parallel connection being connected to a switch for controlling signal.

7. The synchronous rectification control circuit as claimed in claim 1, wherein the third comparator of the dead-time acquisition circuit has an output that is connected to the totem pole circuit of the zero-voltage detection circuit.

8. The synchronous rectification control circuit as claimed in claim 1, wherein the differentiating circuit of the driving circuit comprises a capacitor connected in series to a resistor to form a high pass filter.

* * * * *